(12) United States Patent
Giovannetti et al.

(10) Patent No.: US 10,012,237 B2
(45) Date of Patent: Jul. 3, 2018

(54) COMPOSITE COMPRESSOR IMPELLER WITH AN EROSION RESISTANT COATING AND METHODS OF MANUFACTURING

(76) Inventors: Iacoppo Giovannetti, Florence (IT); Andrea Massini, Florence (IT)

( * ) Notice: Subject to any disclaimer, the term of this patent is extended or adjusted under 35 U.S.C. 154(b) by 736 days.

(21) Appl. No.: 14/127,600

(22) PCT Filed: Jun. 20, 2012

(86) PCT No.: PCT/EP2012/061894
§ 371 (c)(1),
(2), (4) Date: Dec. 19, 2013

(87) PCT Pub. No.: WO2012/175577
PCT Pub. Date: Dec. 27, 2012

(65) Prior Publication Data
US 2014/0093376 A1    Apr. 3, 2014

(30) Foreign Application Priority Data

Jun. 21, 2011  (IT) .............................. CO2011A0021

(51) Int. Cl.
F04D 29/28    (2006.01)
F04D 29/02    (2006.01)
(Continued)

(52) U.S. Cl.
CPC ............ F04D 29/284 (2013.01); B29C 33/52 (2013.01); B29C 37/0032 (2013.01);
(Continued)

(58) Field of Classification Search
CPC ...... F01D 5/288; F04D 29/284; F04D 29/289; F04D 29/023; F05D 2300/2263;
(Continued)

(56) References Cited

U.S. PATENT DOCUMENTS 3,321,347 A    5/1967  Price et al.
3,970,527 A *  7/1976  Brown ..................... C25D 1/00
                                                            205/109
(Continued)

FOREIGN PATENT DOCUMENTS

CA    1026261 A    2/1978
CN    1184898 A    6/1998
(Continued)

OTHER PUBLICATIONS

Unofficial English translation of Office Action issued in connection with corresponding JP Application No. 2014-516331 dated Mar. 22, 2016.
(Continued)

*Primary Examiner* — Igor Kershteyn
*Assistant Examiner* — Brian P Wolcott
(74) *Attorney, Agent, or Firm* — GE Global Patent Operation

(57) ABSTRACT

Impellers made of composite materials with flow path cavities covered by an erosion resistant coating are manufactured by covering removable molds having shapes corresponding to a negative geometry of the flow path cavities, with the erosion resistant coating using plating or thermal spraying. After shaping and curing a composite material around the molds covered with the erosion resistant coating, the molds are removed, while the erosion resistant coating remains on the composite impeller.

15 Claims, 6 Drawing Sheets

(51) Int. Cl.
  *F01D 5/28* (2006.01)
  *B29C 33/52* (2006.01)
  *B29C 37/00* (2006.01)

(52) U.S. Cl.
  CPC ........... *F01D 5/288* (2013.01); *F04D 29/023* (2013.01); *F04D 29/289* (2013.01); *B29C 2037/0035* (2013.01); *B29C 2037/0039* (2013.01); *F05C 2253/04* (2013.01); *F05C 2253/12* (2013.01); *F05D 2230/21* (2013.01); *F05D 2230/23* (2013.01); *F05D 2230/311* (2013.01); *F05D 2260/95* (2013.01); *F05D 2300/16* (2013.01); *F05D 2300/2263* (2013.01); *F05D 2300/611* (2013.01)

(58) Field of Classification Search
  CPC ........... F05D 2300/611; F05D 2300/16; F05D 2230/23; F05D 2260/95; F05C 2253/04; F05C 2253/12; B29C 37/0032; B29C 33/448; B29C 33/56; B29C 33/52; B29C 70/42
  See application file for complete search history.

(56) References Cited

U.S. PATENT DOCUMENTS

| 2005/0045042 | A1 | | 3/2005 | Kim |
| 2007/0099027 | A1 | * | 5/2007 | Krishnamurthy ....... B32B 15/01 428/698 |
| 2007/0283382 | A1 | | 12/2007 | Boston et al. |

FOREIGN PATENT DOCUMENTS

| CN | 1975172 | A | | 6/2007 | |
| CN | 101793258 | A | | 8/2010 | |
| DE | 102010000816 | A1 | * | 7/2011 | ............ F01D 5/288 |
| EP | 0313923 | A2 | | 5/1989 | |
| JP | 5085708 | | | 7/1975 | |
| JP | 5111044 | B1 | | 4/1976 | |
| JP | 5421926 | A | | 2/1979 | |
| JP | S5421926 | A | * | 2/1979 | |
| JP | 62161990 | A | | 7/1987 | |
| JP | 6415472 | A | | 1/1989 | |
| JP | 2072911 | A | | 3/1990 | |
| JP | H0272911 | A | * | 3/1990 | |
| JP | 10259790 | A | | 9/1998 | |
| JP | 2000205181 | A | | 7/2000 | |
| JP | 2001300941 | A | * | 10/2001 | |
| JP | 2003019735 | A | | 1/2003 | |
| JP | 2007283382 | A | | 11/2007 | |
| SU | 204550 | A2 | | 10/1967 | |
| WO | 2005092586 | A1 | | 10/2005 | |
| WO | 2011063334 | A1 | | 5/2011 | |
| WO | WO 2011063334 | A1 | * | 5/2011 | ....... B29C 45/14065 |

OTHER PUBLICATIONS

Unofficial English Translation of Russian Office Action issued in connection with corresponding Application No. 2013154031 dated May 10, 2016.
Unofficial English Translation of Chinese Office Action issued in connection with corresponding CN Application No. 201280030690.4 dated Aug. 31, 2015.
International Search Report dated Jan. 17, 2013 which was issued in connection with PCT Patent Application No. PCT/EP12/061894 which was filed on Jun. 2, 2012.
Italian Search Report dated Jan. 24, 2012 which was issued in connection with Italian Patent Application No. CO2011A000021 which was filed on Jun. 21, 2011.
Unofficial English Translation of Japanese Notice of Allowance issued in connection with corresponding JP Application No. 2014516331 dated Mar. 22, 2016.
Russian Office Action issued in connection with corresponding RU Application No. 2013154031 dated Nov. 25, 2016.
Unofficial English Translation of Chinese Office Action issued in connection with Corresponding CN Application No. 201280030690.4 dated Nov. 4, 2016.

\* cited by examiner

10

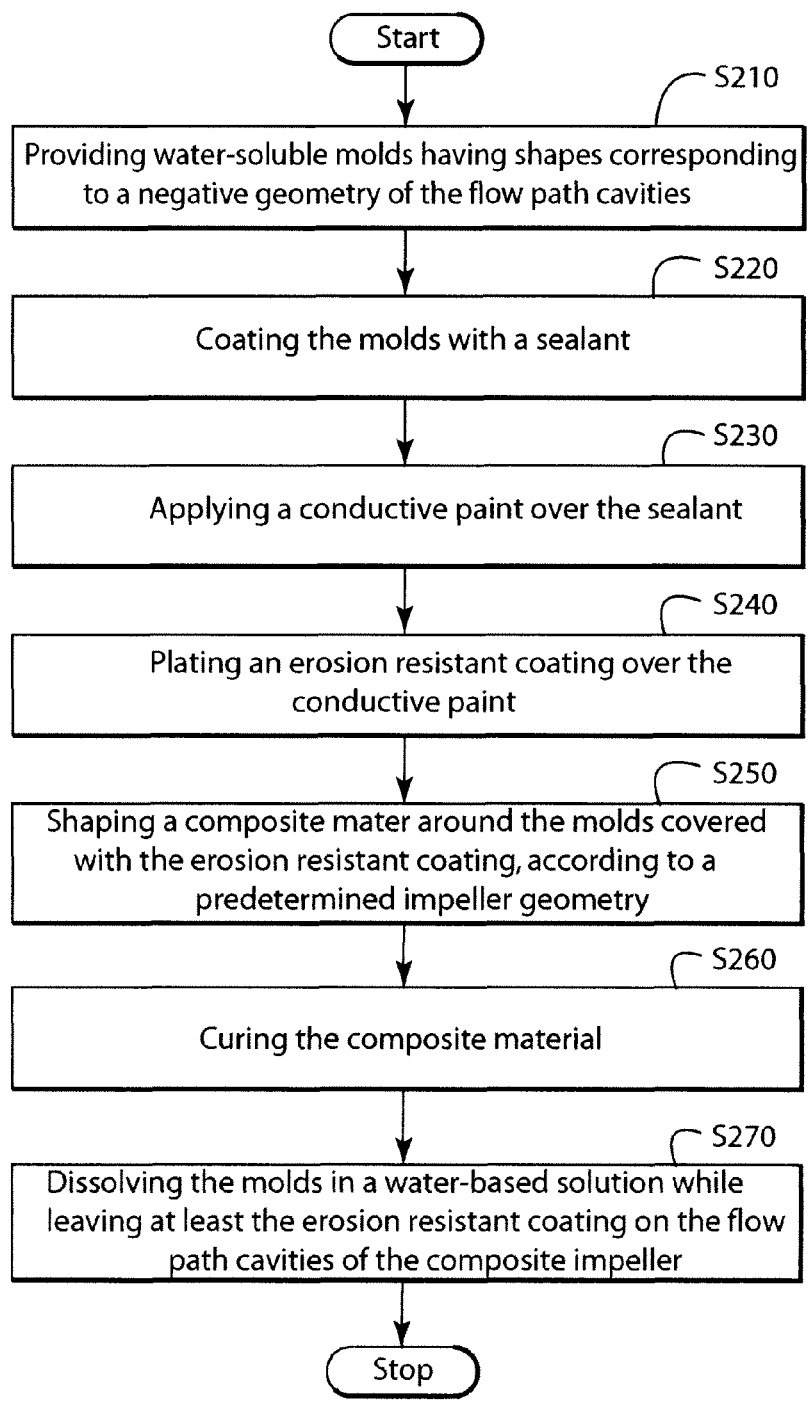

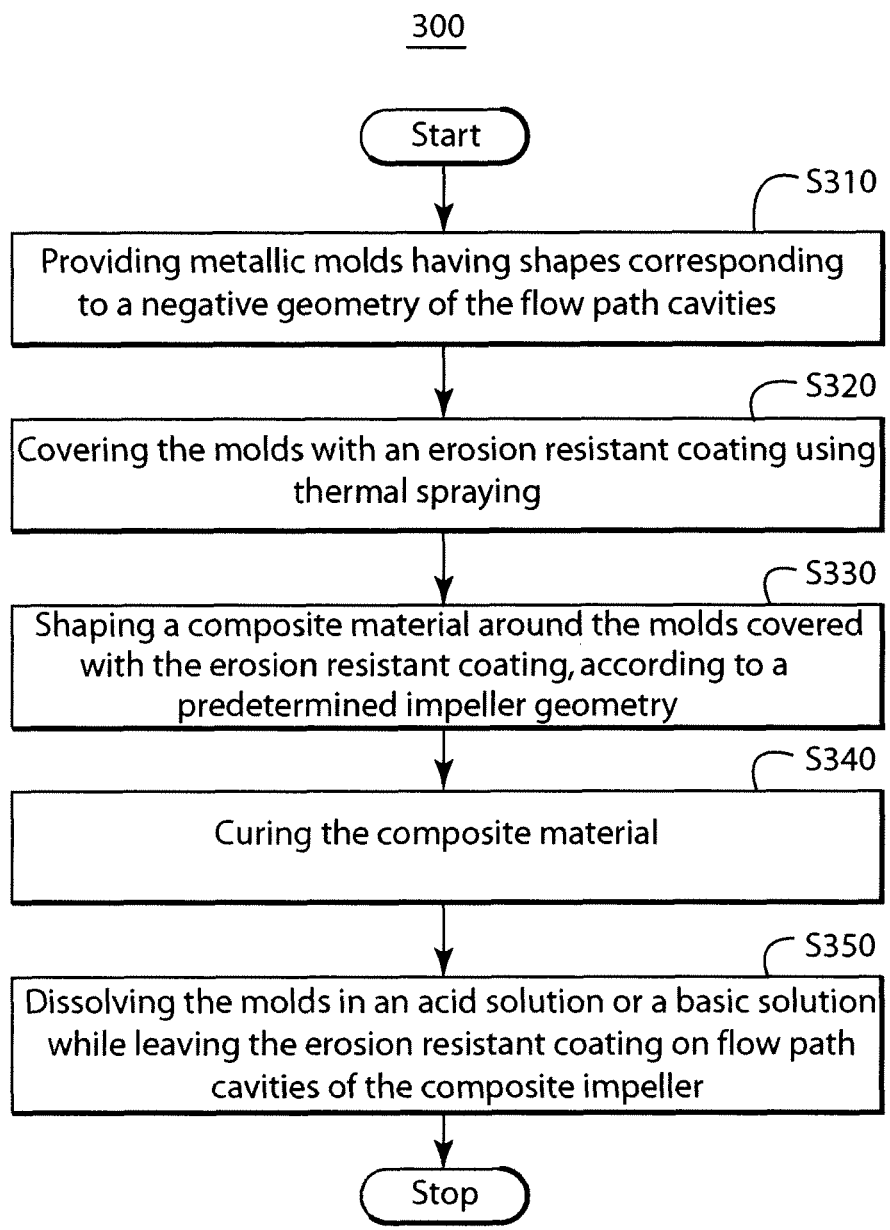

COMPOSITE COMPRESSOR IMPELLER WITH AN EROSION RESISTANT COATING AND METHODS OF MANUFACTURING

BACKGROUND

Technical Field

Embodiments of the subject matter disclosed herein generally relate to methods of manufacturing and impellers manufactured to have an erosion resistant coating.

Discussion of the Background

Compressors are a particular type of turbo-machine that increases the pressure of a compressible fluid (e.g., gas) by using mechanical energy. Various types of compressors are used in processing plants in the oil and gas industry. Among these compressors, there is the so-called centrifugal compressor in which energy is supplied to the gas particles by centrifugal acceleration. The centrifugal acceleration may be achieved by the rotation of a rotating member. The rotating member includes one or more impellers.

Depending on its particular geometry and its functional principle, an impeller may include a well-defined fluid pathway. For example, a centrifugal impeller 1 is shown in FIG. 1 and has blades 3, connected to a hub 2, and covered by a shroud 4, which may be made of composite material. The impeller 1 has a substantially three-dimensional profile around a rotational axis X3D. A fluid flow passes from an axial inlet orifice 5 towards a substantially radial outlet orifice 7. A pathway between the inlet orifice 5 and the outlet orifice 7 is a flow path cavity.

Traditionally impellers were made of metal. Recently impellers made partially or fully from composite materials have an increasing share in the impeller market. The impellers made partially or fully from composite materials have better corrosion resistance in certain environments, such as, the ones occurring in oil and gas drilling.

One problem with the composite impeller is that the composite material has a lower erosion resistance than metals, that is, the composite material wears away due to impact with solid particles or liquid droplets in the flow. This low erosion resistance, in particular around flow path cavities, leads to a relative fast destruction of the impeller and, thus, to down time for replacing it.

Epoxy paints have been applied on composite impeller in an attempt to enhance erosion resistance. However, these paints have low adhesion and do not provide enough protection, for example, when impellers are used in oil and gas industry where a mainly fluid flow includes solid particles or liquid droplets.

Accordingly, it would be desirable to provide systems and methods that avoid the afore-described problems and drawbacks.

SUMMARY

According to one exemplary embodiment, a method of manufacturing a composite impeller with flow path cavities having an erosion resistant coating is provided. The method includes (i) providing molds having shapes corresponding to a negative geometry of the flow path cavities, (ii) covering the molds with an erosion resistant coating, (iii) shaping a composite material around the molds covered with the erosion resistant coating, according to a predetermined impeller geometry, (iv) curing the composite material, and (v) removing the molds to leave the erosion resistant coating on the flow path cavities of the composite impeller.

According to another embodiment, an impeller has blades, a shroud in contact with the blades and having flow path cavities therethrough, and an erosion resistant coating on the flow path cavities. The erosion resistant coating is made by (i) providing water-soluble molds having shapes corresponding to a negative geometry of flow path cavities, (ii) coating the molds with a sealant, (iii) applying a conductive paint over the sealant, (iv) plating an erosion resistant layer over the conductive paint, (v) shaping a composite material around the molds covered with the sealant, the conductive paint and the erosion resistant coating, according to a predetermined geometry, (vi) curing the composite material, and (vii) dissolving the molds in a water-based solution while leaving at least the erosion resistant coating on the flow path cavities of the impeller.

According to another exemplary embodiment, an impeller has blades, a shroud in contact with the blades and having flow path cavities therethrough and an erosion resistant coating on the flow path cavities. The erosion resistant coating is made by (i) providing metallic molds having shapes corresponding to a negative geometry of flow path cavities, (ii) covering the molds with an erosion resistant layer using thermal spraying, (iii) shaping a composite material around the molds covered with the erosion resistant coating, according to a predetermined geometry, (iv) curing the composite material, and (v) dissolving the molds in an acid solution or in a basic solution, while leaving at least the erosion resistant coating on the flow path cavities of the impeller.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 6 is a flow chart of a method of manufacturing composite impellers with flow path cavities having erosion resistant coating, according to another exemplary embodiment; and FIG. 7 is a flow chart of a method of manufacturing composite impellers with flow path cavities having erosion resistant coating, according to another exemplary embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of composite impellers useable in the oil and gas industry. However, the embodiments to be discussed next are not limited to these systems, but may be applied to other systems that use composite impellers in a fluid flow that includes solid particles or liquid droplets.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
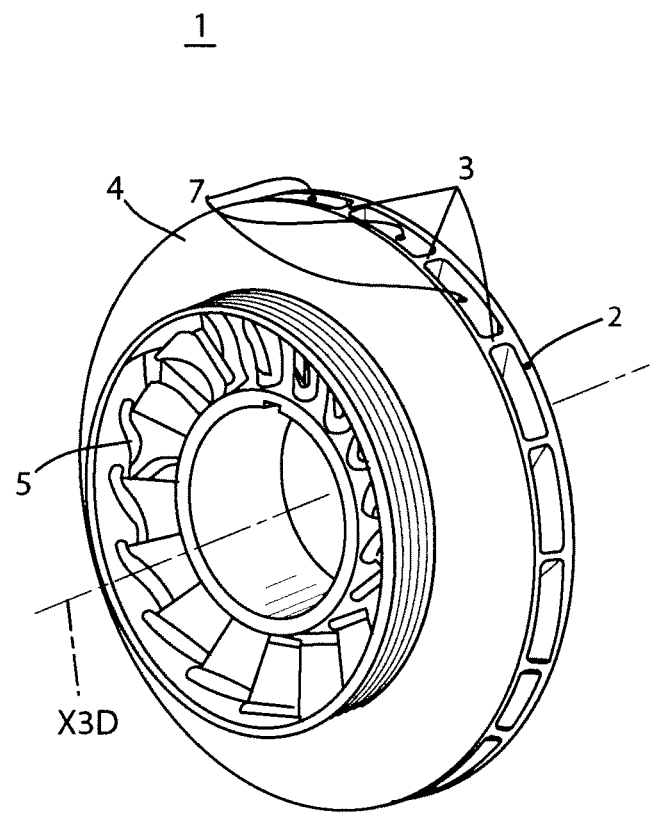
FIG. 1 is an illustration of an impeller with a well defined flowpath therethrough.
Figure 2:
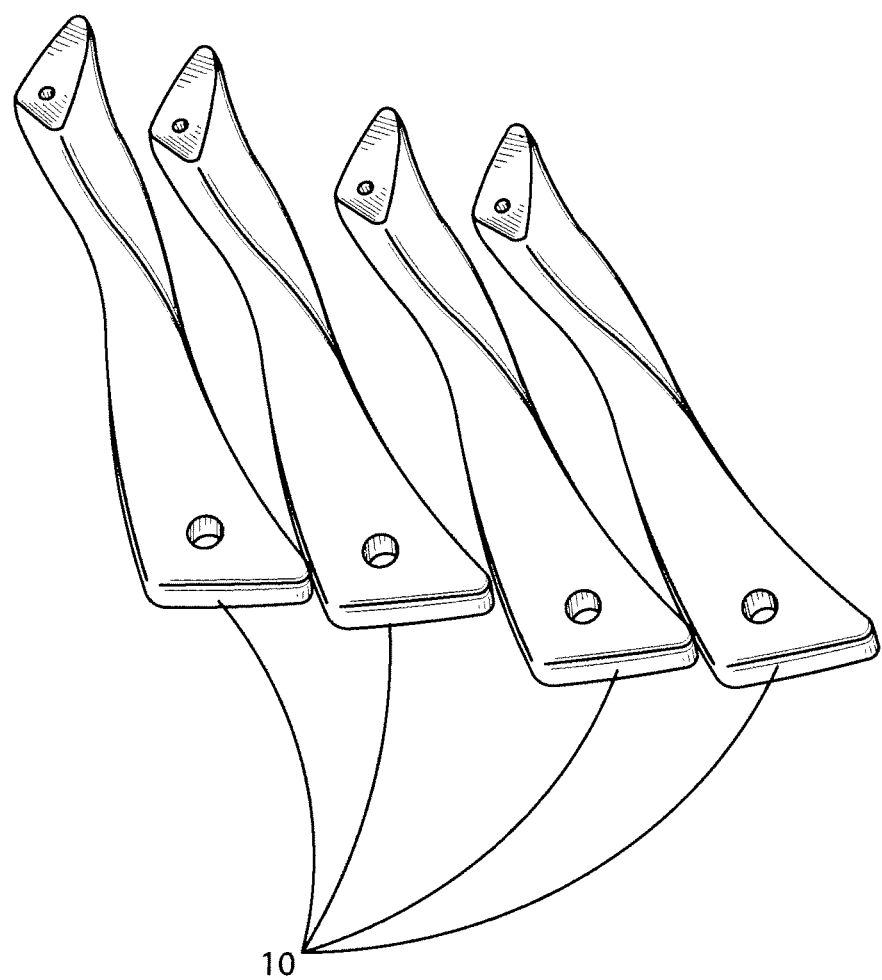
FIG. 2 is an illustration of flow path cavity molds useable in various exemplary embodiments.

Flow path cavities soluble molds are used in manufacturing composite impellers having flow path cavities. Flow path cavity molds 10 are illustrated in FIG. 2. Each of the molds 10 has a complex three dimensional shape, with a geometry which is complementary to the geometry of the flow path cavity in the manufactured impeller. Being complementary means that a mold has the shape of a liquid filling the cavity of the impeller, and the geometry of the mold may be indicated as a negative geometry.

The molds 10 may be made of a water-soluble material or of a metal that can be dissolved using strong acid or basic solutions. As an example of water-soluble material may be a water-soluble epoxy resin or a material such as the material currently marketed under the name AQUAPOUR (manufactured by AeroConsultants, Switzerland). Metals that can be used to manufacture the molds are copper and mild steel (i.e., steel with less than 15% C) and other metal alloys.

Figure 3:
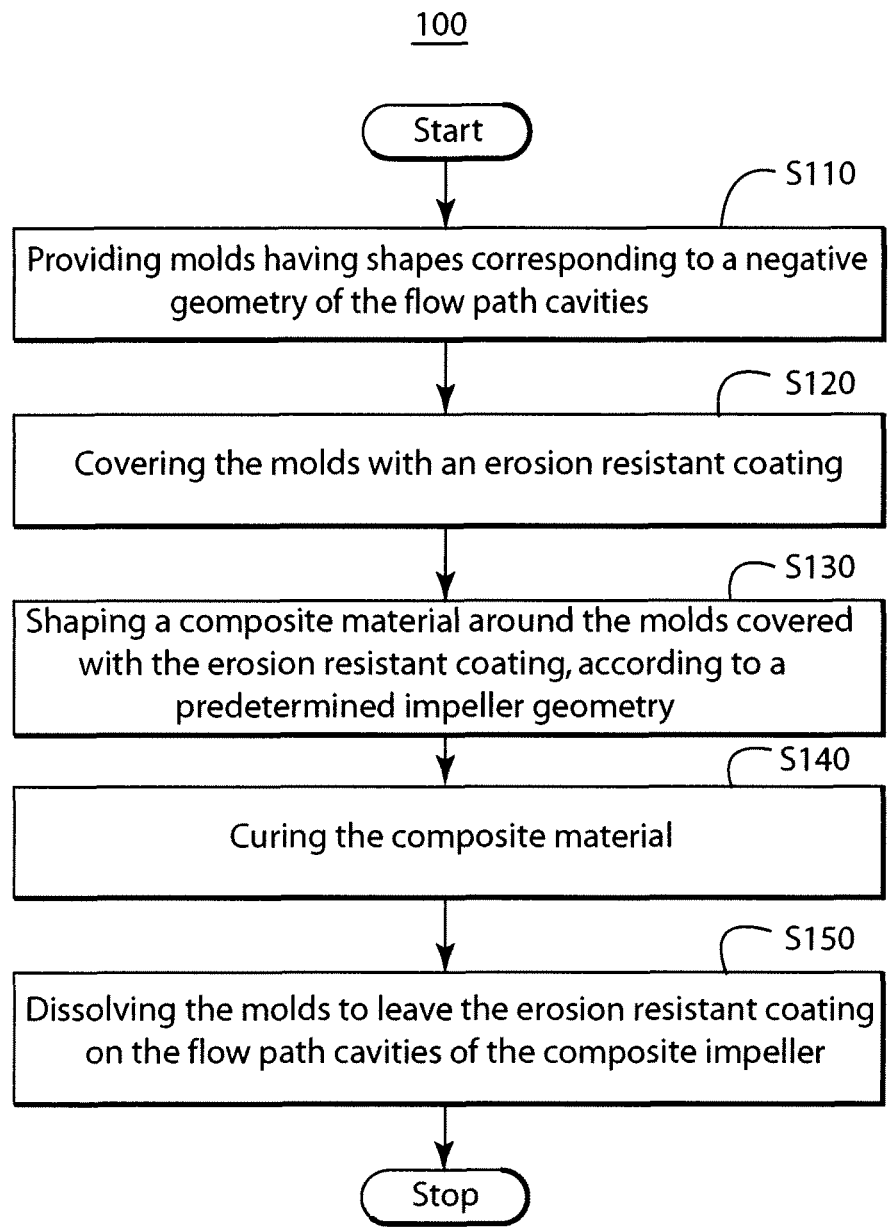
FIG. 3 is a flow chart of a method of manufacturing composite impellers with flow path cavities having erosion resistant coating, according to an exemplary embodiment.
Figure 4:
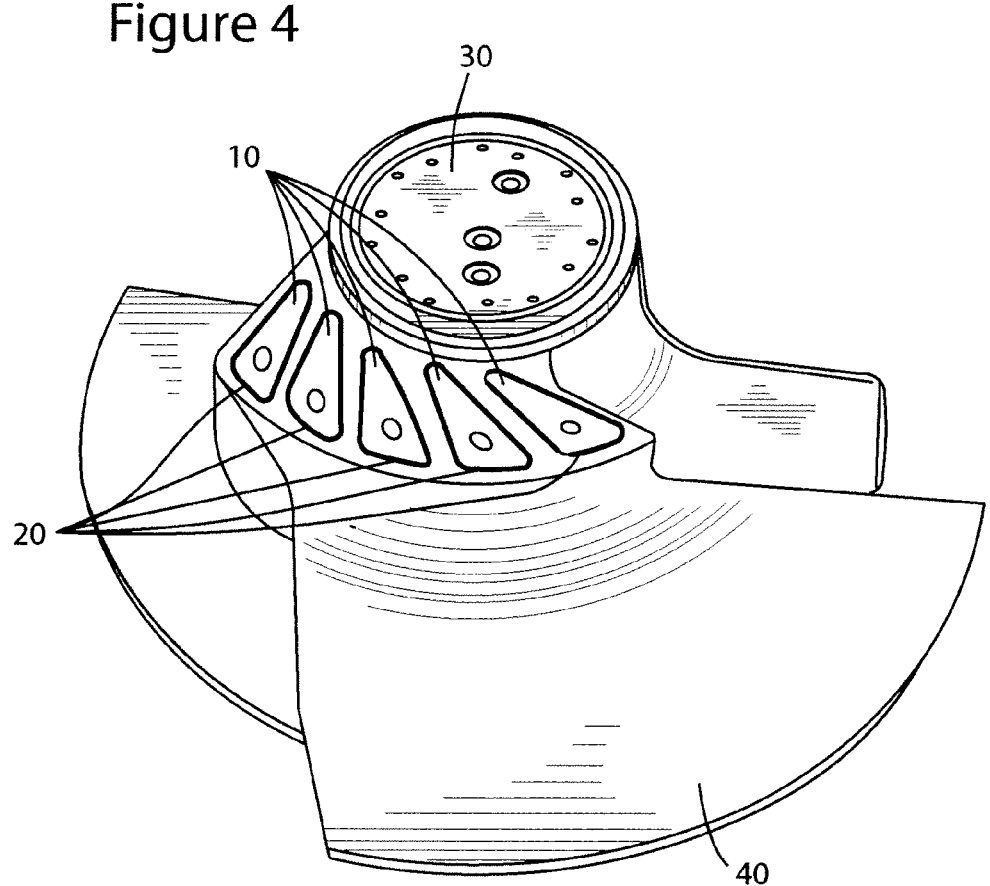
FIG. 4 is a schematic illustration of shaping of composite around molds covered with an erosion resistant coating, which is incorporated in various exemplary embodiments.

A flow chart of a method 100 of manufacturing a composite impeller with flow path cavities having erosion resistant coating according to an exemplary embodiment is illustrated in FIG. 3. The method 100 includes providing molds (e.g., 10) having shapes corresponding to a negative geometry of the flow path cavities at S110, and covering the molds with an erosion resistant coating (e.g., at S120. The method 100 further includes shaping a composite material around the molds covered with the erosion resistant coating, according to a predetermined impeller geometry, at S130, and curing the composite material, at S140. A way of shaping of the composite material around the molds covered with the erosion resistant coating, according to the predetermined impeller geometry is illustrated in FIG. 3 where the molds 10, which have been covered with the erosion resistant coating 20 and are arranged around a core 30 are surrounded by the composite material 40. The composite material may include a resin. Depending on its exact composition a curing temperature may be from room temperature to a few hundreds of degrees Celsius.

Figure 5:
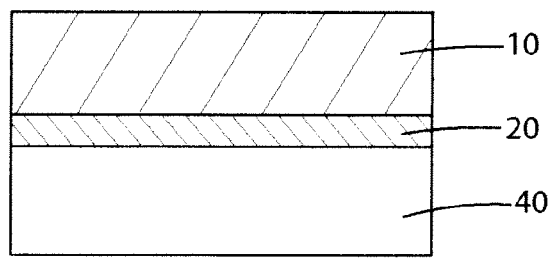
FIG. 5 is a schematic diagram of material layers according to various embodiments, prior to dissolving a mold material.

Finally, the method 100 includes dissolving the mold (e.g., 10) to leave the erosion resistant coating (e.g., 20) on the flow path cavities of the composite impeller (e.g., 40) having the predetermined impeller geometry at S150. Prior to dissolving the molds, at an interface between the mold material 10 and the composite material 40, there is the erosion resistant layer 20 as illustrated in FIG. 5. Once the mold 10 is dissolved, the composite material 40 and the erosion resistant layer 20 remain together.

The manner in which the erosion resistant layer (e.g., 20) is applied on the molds (e.g., 10) depends on the mold material. If the mold is made of a water-soluble material, a plating process may be used. If the mold is made of metal, a plating process, a thermal spraying process, a physical vapor deposition (PVD) process, a chemical vapor deposition (CVD) process or a cold spray process may be used.

The plating process applied on a water-soluble mold includes (i) coating the mold with a sealant, (ii) applying a conductive paint over the sealant and (iii) plating the erosion resistant layer over the conductive layer. The sealant may be a thin layer of epoxy paint applied with a brush. The conductive layer may be a thin layer of paint including silver (Ag) and may also be applied with a brush.

The plating of the erosion layer may include plating a Ni-base layer to provide a basis of growing an erosion resistant structure over it. The plating of this Ni-based layer may be performed using Woods nickel strike. The thickness of the Ni-based layer may be less than 1 mil (i.e., 1/1000 of an inch).

The bulk of the erosion resistant layer may then be applied using electroless nickel plating (ENP). Electroless plating utilized a chemical solution containing metallic ions but no direct current is applied. The electroless plating provides the advantage that uniform layers can be applied uniformly on objects having complex geometries.

The erosion resistant layer plated using ENP may include diamonds of less than 2 lam maximum size, in a proportion around 35% by volume. After the composite material is cured, the water-soluble mold is easily removed using water. The erosion resistance of an impeller having such an erosion resistant layer is about five times larger than that of an impeller without such a layer.

The plating process may be applied also on a mold made of metal. However, on a mold made of metal, the erosion resistant layers may also be applied using a thermal spraying process. The erosion resistant layers applied by thermal spraying provide ten times better resistance than the erosion resistant layers applied by plating.

The erosion resistant layers applied by thermal spraying may be either metallic or cermets. The preferred erosion resistant thermal spray coatings are and cermets and they include both a ceramic and a metallic matrix. For example, the ceramic is WC and the metallic matrix may be a combination of Co and Cr, Ni or a combination of Ni and Cr. Specifically, for the ceramic WC, a combination 10Co4Cr has been tested where 10 and 4 represent volume percentage of the metals. In another example, the ceramic is $Cr_2Co_3$ and the metallic matrix is NiCr. The thickness of the erosion resistant layer applied using thermal spraying may be over 10 mil.

A composite impeller with flow path cavities having an erosion resistant coating according to another exemplary embodiment can be made using the method 200 illustrated in FIG. 6. The method 200 includes providing water-soluble molds having shapes corresponding to a negative geometry of the flow path cavities at S210, coating the molds with a sealant at S220, applying a conductive paint over the sealant at S230, plating an erosion resistant layer over the conductive paint at S240, shaping a composite material around the molds covered with the sealant, the conductive paint and the erosion resistant coating, according to a predetermined impeller geometry at S250, curing the composite material at S260 and dissolving the molds in a water-based solution while leaving at least the erosion resistant coating on the composite impeller at S270.

A composite impeller with flow path cavities having an erosion resistant coating according to another exemplary embodiment can be made using the method 300 illustrated in FIG. 6. The method 300 includes providing metallic molds having shapes corresponding to a negative geometry of the flow path cavities at S310, covering the molds with an erosion resistant coating using thermal spraying at S320, shaping a composite material around the molds covered with the erosion resistant coating, according to a predetermined impeller geometry at S330, curing the composite material at S340, and dissolving the molds in an acid solution or in a basic solution, while leaving the erosion resistant coating on the composite material at S350.

The disclosed exemplary embodiments provide methods of producing impellers made of composite materials to have flow path cavities covered by an erosion resistant coating, the erosion resistant coating being initially applied on molds by plating or thermal spraying. It should be understood that this description is not intended to limit the invention. The exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method of manufacturing a composite impeller with flow path cavities having an erosion resistant coating, the method comprising:
   providing molds having shapes corresponding to a negative geometry of the flow path cavities;
   covering the molds with an erosion resistant coating;
   shaping a composite material around the molds covered with the erosion resistant coating, according to a predetermined impeller geometry;
   curing the composite material; and
   removing the molds to leave the erosion resistant coating on the flow path cavities of the composite impeller, wherein covering the molds with the erosion resistant coating comprises: coating the molds with a sealant; applying a conductive paint over the sealant; and plating an erosion resistant layer over the conductive paint.

2. The method of claim 1, wherein the composite material includes a resin.

3. The method of claim 1, wherein the molds are made of a water-soluble material and removing the molds is performed by dissolving in a water-based solution.

4. The method of claim 1, wherein the sealant is an epoxy paint.

5. The method of claim 1, wherein the conductive paint includes silver.

6. The method of claim 1, wherein the plating of the erosion resistant layer comprises:
   plating a Ni-based layer over the conductive paint; and
   plating the erosion resistant layer over the Ni-based layer using electroless nickel plating (ENP).

7. The method of claim 6, wherein the plating of the Ni-based layer over the conductive paint is performed using a Woods nickel strike.

8. The method of claim 6, wherein the Ni-based layer over the conductive paint has a thickness of less than 1 mil.

9. The method of claim 6, wherein the erosion resistant layer plated using ENP includes diamonds of less than 2 μm size, in a proportion around 35% by volume.

10. The method of claim 1, wherein the molds are made of a metal and removing the molds is performed by dissolving in an acid solution or in a basic solution.

11. The method of claim 10, wherein the molds are made of copper or mild steel.

12. The method of claim 10, wherein the removing of the mold is performed by dissolving in nitric acid.

13. The method of claim 10, wherein the covering of the molds with the erosion resistant coating is performed by thermal spraying.

14. The method of claim 13, wherein the erosion resistant coating is made of a ceramic and a metallic glue.

15. The method of claim 14, wherein (a) the ceramic is WC and the metallic glue is one of (i) a combination of Co and Cr, (ii) Ni, or (iii) a combination of Ni and Cr, or (b) the ceramic is Cr2C3 and the metallic glue is a combination of Ni and Cr.

* * * * *